Nov. 21, 1967 J. S. MATHIAS ET AL 3,353,986
ELECTROLESS DEPOSITION OF COBALT-IRON-PHOSPHOROUS MAGNETIC MATERIAL
Filed Nov. 20, 1963
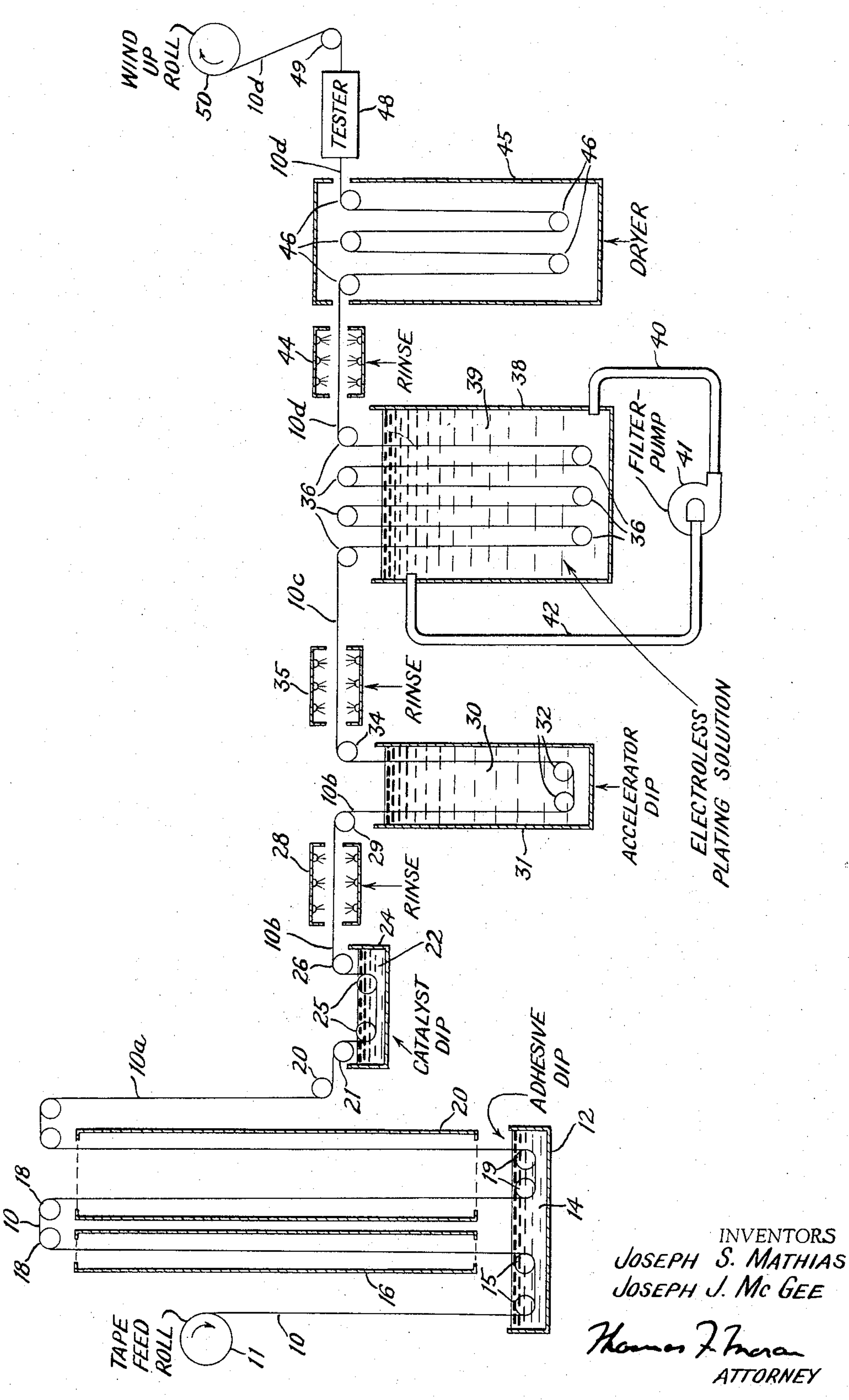
INVENTORS
JOSEPH S. MATHIAS
JOSEPH J. MC GEE
Thomas F. Moran
ATTORNEY United States Patent Office 3,353,986
Patented Nov. 21, 1967

3,353,986
ELECTROLESS DEPOSITION OF COBALT-IRON-PHOSPHOROUS MAGNETIC MATERIAL

Joseph Simon Mathias, Riverton, N.J., and Joseph John McGee, Colwyn, Pa., assignors to Sperry Rand Corporation, New York, N.Y., a corporation of Delaware Filed Nov. 20, 1963, Ser. No. 324,949
9 Claims. (Cl. 117—47)

This invention relates to ferromagnetic materials. More particularly, this invention relates to ferromagnetic materials and compositions and method and apparatus for preparing and depositing same.

This invention is especially concerned with the production of improved ferromagnetic thin film material, such as tapes, useful for the storage of information, such as tapes useful in computers, e.g., digital computers, and useful in the recording of radio and television programs, so-called video tapes.

It is an object of this invention to provide an improved ferromagnetic material.

In accordance with one embodiment, it is an object of this invention to provide an improved ferromagnetic thin film material, such as tape, e.g., Mylar tape, coated with or having deposited thereon a thin film of ferromagnetic material.

It is another object of this invention to provide an improved process for the deposition of ferromagnetic material onto a suitable substrate, such as a tape.

It is yet another object of this invention to provide improved apparatus for the electroless deposition of ferromagnetic material onto a suitable substrate, such as tape.

Yet another object of this invention is to provide improved ferromagnetic thin film materials, such as tapes, provided with a coating or thin film of ferromagnetic material on one or both surfaces thereof, and compositions useful in the electroless deposition of such thin film ferromagnetic materials.

How these and other objects of this invention are accomplished will become apparent in the light of the accompanying disclosure made with reference to the accompanying drawing which schematically illustrates apparatus and method for the production of thin film ferromagnetic materials in accordance with this invention.

In accordance with this invention an improved process for the electroless deposition of ferromagnetic materials onto a suitable substrate, such as a tape, is provided by coating the surface of said substrate material with a layer of adhesive material, such as a layer of rubber, natural or synthetic, and/or resinous material. Following the adhesive coating operating the surface of the substrate undergoing treatment is treated with a seeding or catalyst solution, such as a solution of a water-soluble compound, such as a salt, of a metal selected from the group consisting of the platinum group metals, e.g., platinum, palladium, and gold. Following the seeding or catalyst dip operation the treated substrate surface is then contacted with an accelerating solution, such as an aqueous solution of a water-soluble compound, such as a salt, of a metal selected from the group consisting of tin and titanium.

Following the above sequence of treating operations, adhesive coating, catalyst dipping and accelerator dipping, the thus-treated surface of the substrate is brought into contact with an electroless plating solution under conditions to electrolessly deposit on the treated surface of the substrate a ferromagnetic alloy of the desired composition and physical properties.

In accordance with one embodiment of the invention ferromagnetic alloy material deposited on the substrate consists essentially of cobalt and minor amounts of iron and phosphorus, such as a ferromagnetic alloy consisting essentially of about 90% by weight cobalt and minor, substantially equal, about 5%, amounts by weight iron and phosphorus, e.g., 90% by weight cobalt, about 5.4% by weight iron and about 4.6% by weight phosphorus. Electroless plating solutions in accordance with this invention effective to deposit such ferromagnetic alloy material have the composition:

| Component: | Concentration |
|---|---|
| Water-soluble cobalt salt, e.g., cobalt sulfate | 20–40 grams per liter, e.g., 30. |
| Water-soluble ammonium salt, e.g., ammonium sulfate | 40–80 grams per liter, e.g., 50. |
| Buffer salt, e.g., Rochelle salt | 100–600 grams per liter, e.g., 200. |
| Water-soluble hypophosphite, e.g., sodium hypophosphite | 10–30 grams per liter, e.g., 20. |
| Inhibitor, e.g., potassium thiocyanate | 0–1.5 cc. per liter of a 1–2 grams per liter solution. |
| Ferrous ammonium sulfate | Minor amounts as required or desired to effect desired magnetic properties in the resulting electrolessly deposited ferromagnetic material. For example, approximately 1.5 grams per liter yields an electrolessly deposited alloy having the physical property $H_c$ 250. |

Referring now to the drawing which schematically illustrates the method and apparatus in accordance with this invention, Mylar tape 10, i.e., a tape made up of polyethylene terephthalate resin material, is supplied from feed roll 11 to container 12 provided with a bath 14 of adhesive coating material. The adhesive coating material making up bath 14 within container 12 comprises an admixture of rubber, natural and/or synthetic, and resin in solution, such as prepared by the admixture of one part by volume Bondmaster G–379, a mixture of natural and synthetic rubber and resin, and 10 parts by volume solvent made up of a 50–50 mixture of acetone and methyl ethyl ketone. Other rubber-resin adhesive materials are commercially available and are useful in the practice of this invention. The addition of the rubber-resin adhesive material, Bondmaster G–379, to the solvent gives rise to a temporary emulsion and periodic or continuous stirring of bath 14 within container 12 is desirable and may be necessary so as to produce a uniform coating of the adhesive material on tape 10. Stirring of bath 14 of the adhesive mixture should not be too vigorous since air bubbles entrapped within bath 14 may cause uncoated spots on tape 10 passing therethrough.

Tape 10 moves within container 12 immersed within bath 14 and in contact with rollers 15. Adhesive coated tape 10 then moves up within and through dryer 16, such as a hot air dryer. Drying of the tape should be complete since no moisture should be present on the tape as it enters the subsequent catalyst dip operation. Desirably, a double adhesive coating is applied onto the tape by passing tape 10 over an upper set of rollers 18 and then under another set of rollers 19 provided within container 12. After the second adhesive dip operation, the resulting adhesive coated tape 10*a* is passed through dryer 20, such as a hot air and/or infra-red ray dryer, to effect thorough and complete removal of any moisture from the tape. It has been observed that approximately 500 cc. of the adhesive mixture in bath 14 is sufficient to coat approximately 80–90 square feet of Mylar tape.

The resulting dried, adhesive coated Mylar tape 10*a* is then passed over rollers 21 into contact with a bath 22 of a catalyst dip within container 24. Bath 22 of catalyst dip is made up of an aqueous solution of a water-soluble compound or salt of a metal selected from the group consisting of the platinum group metals, e.g. platinum, palladium, iridium, and gold, such as palladium chloride and chloroplatinic acid. Bath 22 of catalyst dip is suitably prepared from a commercial product sold by Shipley Company under the name Catalyst 6F.

As illustrated, adhesive coated Mylar tape 10*a* moves through bath 22 of catalyst dip within container 24, passing over rollers 25 immersed therein. Tape 10*a* should desirably remain in contact with the catalyst dip for at least about 45 seconds, preferably 1–2 minutes. Following the catalyst dip operation catalyzed, adhesive coated tape 10*b* passes over roller 26 through rinse means 28 provided with water sprays for washing both sides of tape 10*b*. Rinsed, catalyzed tape 10*b* passes over roller 29 and is immersed in bath 30 of accelerator dip provided within container 31; tape 10*b* moves through bath 30 under rollers 32 provided within container 31.

Bath 30 is an aqueous acid solution of a compound effective to reduce the noble metal compound, such as the palladium or platinum compound, adsorbed or otherwise acquired on the surface of tape 10*b* during the catalyst dip operation. Bath 30 may be prepared by adding approximately five parts by volume water to one part by volume of an aqueous acid solution of a water-soluble compound or salt of a metal selected from the group consisting of tin and titanium and other similar metals, such as Accelerator 19 commercially available from Shipley Company.

Catalyzed tape 10*b* upon passing through the accelerator dip operation has at least a portion of the adsorbed or acquired noble metal compound reduced to the corresponding elemental, active metal. Desirably, the accelerator dip operation, i.e. contact of tape 10*b* with bath 30, should extend for about 1½ minutes, more or less. The accelerator dip operation therefore serves as a sensitizing operation. It is thus seen that the operations described are in the sequence, adhesive dip, catalyst or seeding dip, followed by the accelerator dip, a sequence of operations not heretofore employed in electroless plating operations of the type with which the subject invention is concerned.

Following the accelerator dip operation tape 10*c* passes over roller 34 and through rinse means 35 provided with water sprays, like rinse means 28, to thoroughly wash both sides or surfaces of the tape. The resulting rinsed, catalyzed and sensitized tape 10*c* is then passed over an array of rollers 36 provided within tank 38 which contains electroless plating bath 39. A suitable and preferred electroless plating bath in accordance with this invention has the composition:

| | |
|---|---|
| Cobalt sulfate | 30 grams per liter. |
| Ammonium sulfate | 50 grams per liter. |
| Rochelle salt | 200 grams per liter. |
| Sodium hypophosphite | 20 grams per liter. |
| Potassium thiocyanate | 1 cc. per liter of a 1.5 grams per liter solution. |
| Ferrous ammonium sulfate | In an amount to yield desired magnetic properties; approximately 1.5 grams per liter for $H_c$ 250 at bath temperature of 71° C. and bath pH 7.8. |

The cobalt concentration in bath 39 is maintained at the level of 30 grams per liter by the periodic addition of colbalt sulfate as the cobalt content of the bath is depleted due to the electroless deposition on the tape moving therethrough of a thin film of ferromagnetic alloy having the composition:

| | Percent by weight |
|---|---|
| Cobalt | 90 |
| Iron | 5.4 |
| Phosphorus | 4.6 |

The concentration of hypophosphite ion in bath 39 is maintained by the periodic addition of sodium hypophosphite on substantially the same basis. Similarly, additions of ferrous ammonium sulfate are made as the iron content of bath 39 is depleted during the electroless plating operation. The addition of ferrous ammonium sulfate is usually made on the basis of the $H_c$ value of the ferromagnetic alloy electrolessly deposited on the tape. In addition to lowering the $H_c$ value of the ferromagnetic alloy is was found that the addition of ferrous ammonium sulfate also raises the $\phi r$ value permitting a thinner coating of the ferromagnetic cobalt-iron-phosphorus alloy to be deposited. A thinner coating of electrolessly deposited ferromagnetic material tends to avoid problems of peeling or blistering which are prevalent when a thick coating of electrolessly deposited ferromagnetic alloy material is laid down on the tape.

Electroless plating bath 39 is desirably maintained at a suitable temperature, such as a temperature in the range 60–90° C., usually in the range 70–80° C., effective to deposit the desired thickness of ferromagnetic alloy material onto the tape within a reasonable residence time within tank 38. Lower bath temperatures slow down the rate of electroless deposition of the ferromagnetic alloy onto the tape and tend to maintain the electroless plating bath more stable with less danger of uncontrollable decomposition. Higher bath temperatures increase the rate of electroless deposition and also the danger of autocatalytic decomposition of the bath. The addition of a stabilizer, e.g. a thiocyanate, such as potassium thiocyanate, to the plating bath acts to prolong the useful life of the plating bath.

Another technique in accordance with this invention, illustrated in the drawing, for prolonging the useful life of plating bath 39 involves continuously withdrawing plating solution from tank 38 via conduit 40 and passing the solution through a filter-pump 41 for removal of any extraneous solids from the solution which solids might tend to autocatalytically decompose the solution. The thus-withdrawn, now solids-free plating solution is returned to tank 38 via conduit 42.

Following the electroless plating operation tape 10*d* now having a thin film of ferromagnetic cobalt-iron-phosphorus alloy electrolessly deposited thereon is passed through rinse means 44 wherein both sides of tape 10*d* are thoroughly washed with water sprays. Tape 10*d* is then passed through hot air and/or radiant heat dryer 45 passing over rollers 46 therein. The resulting dried tape is then passed through tester 48, such as a BH tester, for testing the magnetic properties of the ferromagnetic alloy deposited on tape 10*d*. It is pointed out that the addition of ferrous ammonium sulfate to plating bath 39 may be made on the basis of the $H_c$ readings taken on tape 10*d* as it moves through tester 48. The finished tested tape 10*d* passes over roller 49 onto wind-up roll 50 for shipment.

In the operations described herein for the preparation of magnetic thin film tape, it is desirable that all equipment which comes into contact with the treating solutions, particularly the plating solution, such as the rollers, roller-frames, hardware, pump parts, etc., be non-metallic or made of non-magnetic stainless steel. Also, desirably, all the material of construction which is utilized should absorb little, if any, moisture and should be smooth-surfaced. Additionally, in the operation of the electroless plating bath it is desirable that the plating bath be maintained at a pH in the range 7.6–8.0. The pH adjustment of the plating bath may be made by addition of ammonium hydroxide.

In carrying out the practice of this invention it has been found that the following factors affect the magnetic properties of the electrolessly deposited ferromagnetic alloy:

(1) Concentration of iron in the plating bath, i.e. additions of ferrous ammonium sulfate thereto.

(2) Thickness of the electrolessly deposited ferromagnetic alloy.

(3) pH of the electroless plating bath.

In addition it was also noted that the following factors affect the thickness of the electrolessly deposited ferromagnetic alloy:

(a) Bath temperature, rate of electroless deposition increasing with increase in bath temperature.

(b) Bath pH, rate of electroless deposition increasing with increase in bath pH.

(c) Residence time of tape in contact with electroless plating bath.

Further, in the operation of the process in accordance with this invention and the associated equipment, as little tension as possible on the tape is desired to prevent scrape-off and scratches on the electrolessly deposited ferromagnetic alloy thereon. The roller surfaces in contact with the tape should be clean and smooth. After the electroless plating operation the tape should be rinsed well and any excess water blown off by means of air jets and dried with warm air before the dried tape is passed through the tester, such as a BH tester, where the magnetic properties of the electrolessly deposited alloy are picked up and presented on an oscilloscope in the form of a hysteresis loop.

Although considerable emphasis has been placed in the disclosure on the application of the practice of this invention to the electroless deposition of ferromagnetic alloy on Mylar tape, tapes of other materials, such as polyethylene, cellophane, polyvinyl chloride and the like, and other substrate surfaces whether in tape form or not, are also applicable to the practice of this invention.

As will be apparent to those skilled in the art in the light of the foregoing disclosure many modifications, alterations and substitutions may be made in the practice of this invention without departing from the spirit or scope thereof.

The embodiments of the invention in which an exclusive property or privilege is claimed as defined as follows.

We claim:

1. An electroless plating solution useful for the electroless deposition of a ferromagnetic alloy consisting of about 90% by weight cobalt and substantially equal, minor amounts of iron and phosphorus comprising an aqueous solution having the composition 25–40 grams per liter water-soluble cobalt salt, 40–80 grams per liter water-soluble ammonium salt, 100–600 grams per liter Rochelle salt, 20–30 grams per liter sodium hypophosphite, 0–1.5 cc. per liter of 1–2 grams per liter solution of a water-soluble thiocyanate and a minor amount in the range of about 1.5 grams per liter of ferrous ammonium sulfate.

2. An electroless plating solution useful for the electroless deposition of a ferromagnetic alloy consisting of about 90% by weight cobalt and substantially equal, minor amounts of iron and phosphorus comprising an aqueous bath having the composition 25–40 grams per liter cobalt sulfate, 40–80 grams per liter ammonium sulfate, 100–600 grams per liter Rochelle salt, 20–30 grams per liter sodium hypophosphate, 0–1.5 cc. per liter of 1–2 grams per liter solution of a water-soluble potassium thiocyanate and a minor amount in the range of about 1.5 grams per liter of ferrous ammonium sulfate.

3. An electroless plating solution useful for the electroless deposition of a ferromagnetic alloy consisting of about 90% by weight cobalt and substantially equal, minor amounts of iron and phosphorus comprising an aqueous bath having the composition 30 grams per liter cobalt sulfate, 50 grams per liter ammonium sulfate, 200 grams per liter Rochelle salt, 20 grams per liter sodium hypophosphite, 1 cc. per liter of a 1.5 grams per liter solution of potassium thiocyanate and a minor amount in the range about 1.5 grams per liter of ferrous ammonium sulfate.

4. An article comprising a substrate material made up of polyethylene terephthlate resin, a surface of said substrate material having electrolessly deposited thereon a ferromagnetic alloy consisting essentially of about 90% by weight cobalt and substantially equal amounts by weight of iron and phosphorus.

5. An article in accordance with claim 4 wherein said ferromagnetic alloy consists essentially of about 90% by weight cobalt, about 5% by weight iron and about 5% by weight phosphorus.

6. An article in accordance with claim 4 wherein said ferromagnetic alloy consists essentially of about 90% by weight cobalt, about 5.4% by weight iron and about 4.6% by weight phosphorus.

7. A method of effecting the electroless deposition of a ferromagnetic alloy consisting essentially of about 90% by weight cobalt and substantially equal, minor amounts by weight of iron and phosphorus from an electroless plating solution onto a surface of a substrate made up of polyethylene terephthalate resin which comprises coating said surface of said substrate with a layer of adhesive material, contacting the adhesive coated surface with an aqueous palladium-containing solution, contacting the thus-treated surface with an aqueous solution containing a water-soluble salt of a metal selected from the group consisting of tin and titanium and contacting the resulting treated surface of said substrate with an aqueous electroless plating solution having the composition 20–40 grams per liter cobalt sulfate, 40–80 grams per liter ammonium sulfate, 100–600 grams per liter Rochelle salt, 10–30 grams per liter sodium hypophosphite, 0–1.5 cc. per liter of 1.0–2.0 grams per liter aqueous solution of potassium thiocyanate and a minor amount in the range about 1.5 grams per liter of ferrous ammonium sulfate, said plating solution being effective to electrolessly deposit on the surface a ferromagnetic alloy consisting essentially of about 90% by weight cobalt and minor, substantially equal amounts of iron and phosphorus.

8. A method in accordance with claim 7 wherein said electroless plating solution has a composition effective to electrolessly deposit on the surface a ferromagnetic alloy having the composition of about 90% by weight cobalt, about 5.4% by weight iron and about 4.6% by weight phosphorus.

9. A method of effecting the electroless deposition of a ferromagnetic alloy consisting essentially of abut 90% by weight cobalt and substantially equal minor amounts of iron and phosphorus onto the surface of a substrate which comprises applying a coating of dry adhesive material onto the surface of said substrate made up of polyethylene terephthalate resin, contacting the adhesive coated surface with a seeding or catalyst solution, followed by contacting said surface with an accelerating or sensitizing solution and subjecting the thus-treated surface of said substrate to contact with an aqueous electroless plating solution having the composition 20–40 grams per liter cobalt sulfate, 40–80 grams per liter ammonium sulfate, 100–600 grams per liter Rochelle salt, 10–30 grams per liter sodium hypophosphite, 0–1.5 cc. per liter of 1.0–2.0 grams per liter aqueous solution of potassium thiocyanate and a minor amount in the range about 1.5 grams per liter of ferrous ammonium sulfate, being effective to deposit upon the thus-treated surface of said substrate the aforesaid ferromagnetic alloy.

(References on following page)

References Cited

UNITED STATES PATENTS

| | | | |
|---|---|---|---|
| 2,554,803 | 5/1951 | Wysocki | 118—610 |
| 2,827,399 | 3/1958 | Eisenberg | 117—130 |
| 2,929,742 | 3/1960 | De Minjer et al. | 117—130 |
| 3,047,382 | 6/1962 | Harpster | 75—171 |
| 3,116,159 | 12/1963 | Fisher et al. | 117—130 X |
| 3,118,763 | 1/1964 | Thielmann | 75—171 |
| 3,119,709 | 1/1964 | Atkinson | 117—47 |
| 3,119,753 | 1/1964 | Mathias et al. | 117—235 X |
| 3,138,479 | 6/1964 | Foley | 117—47 |
| 3,282,723 | 11/1966 | Melillo | 117—130 X |

OTHER REFERENCES

Berak: Iron-Phosphorous-Cobalt Equilibrium Diagram (1951), Chem. Abstracts, vol. 45, p. 8865f.

Brenner et al.: Deposition of Nickel and Cobalt by Chemical Reduction, Journal of Research of the National Bureau of Standards, Research Paper No. RP 1835, vol. 39, pp. 385–395, November 1947.

IBM Technical Disclosure Bulletin, vol. 6. No. 11, April 1964, pp. 5–7.

Symposium on Electroless Nickel Plating, ASTM Special Tech. Pub. No. 265, p. 16, American Society for Testing Materials, Philadelphia, Pa., 1959, TS 690 A5C.2.

ALFRED L. LEAVITT, *Primary Examiner.*

RICHARD D. NEVIUS, RALPH S. KENDALL, *Assistant Examiners.*

UNITED STATES PATENT OFFICE

CERTIFICATE OF CORRECTION

Patent No. 3,353,986 November 21, 1967

Joseph Simon Mathias et al.

It is hereby certified that error appears in the above numbered patent requiring correction and that the said Letters Patent should read as corrected below.

Column 6, line 53, for "abut 90%" read -- about 90% --; line 55, for "substrate which" read -- substrate made up of polyethylene terephthalate resin which --; lines 57 and 58, for "substrate made up of polyethylene terephthalate resin, contacting" read -- substrate, contacting --.

Signed and sealed this 18th day of February 1969.

(SEAL)

Attest:

Edward M. Fletcher, Jr.
Attesting Officer

EDWARD J. BRENNER
Commissioner of Patents